(12) United States Patent
Soliman et al.

(10) Patent No.: US 8,224,513 B2
(45) Date of Patent: Jul. 17, 2012

(54) TORQUE MODULATION CONTROL OF A HYBRID ELECTRIC VEHICLE

(75) Inventors: Ihab S. Soliman, Warren, MI (US); Andrew J. Silveri, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 858 days.

(21) Appl. No.: 12/163,224

(22) Filed: Jun. 27, 2008

(65) Prior Publication Data

US 2009/0326778 A1    Dec. 31, 2009

(51) Int. Cl.
  *B60L 11/00*   (2006.01)
  *B60K 6/20*    (2007.10)
(52) U.S. Cl. .................... 701/22; 180/65.21
(58) Field of Classification Search .......... 701/1, 99, 701/22, 84, 83, 70, 490; 475/5, 276; 180/65.1–65.8; 477/3; 903/908, 930; 340/995.1, 995.19
See application file for complete search history.

(56) References Cited

U.S. PATENT DOCUMENTS

| | | | |
|---|---|---|---|
| 2004/0249518 A1* | 12/2004 | Okoshi et al. | 701/1 |
| 2006/0113129 A1* | 6/2006 | Tabata | 180/65.2 |
| 2007/0105679 A1* | 5/2007 | Tabata et al. | 475/5 |

* cited by examiner

*Primary Examiner* — James Trammell
*Assistant Examiner* — Muhammad Shafi
(74) *Attorney, Agent, or Firm* — MacMillan, Sobanski & Todd, LLC

(57) ABSTRACT

In a powertrain for motor vehicle that includes an engine, a first electric machine and a second electric machine, each machine being able to function alternately as a motor and a generator, a transmission having an input driveably connected to the engine and the first electric machine and a transmission output driveably connected to the second electric machine and wheels of the vehicle, a method for controlling the powertrain includes using the engine to produce wheel torque, performing a gear shift using the transmission, if a reduction in powertrain output torque is to occur while modulating torque during the gear shift, operating one of the first electric machine and the second machine as an electric generator to reduce the powertrain output torque, and if an increase in powertrain output torque is to occur while modulating torque during the gear shift, operating one of the first electric machine and the second machine as an electric motor to increase the powertrain output torque.

17 Claims, 12 Drawing Sheets

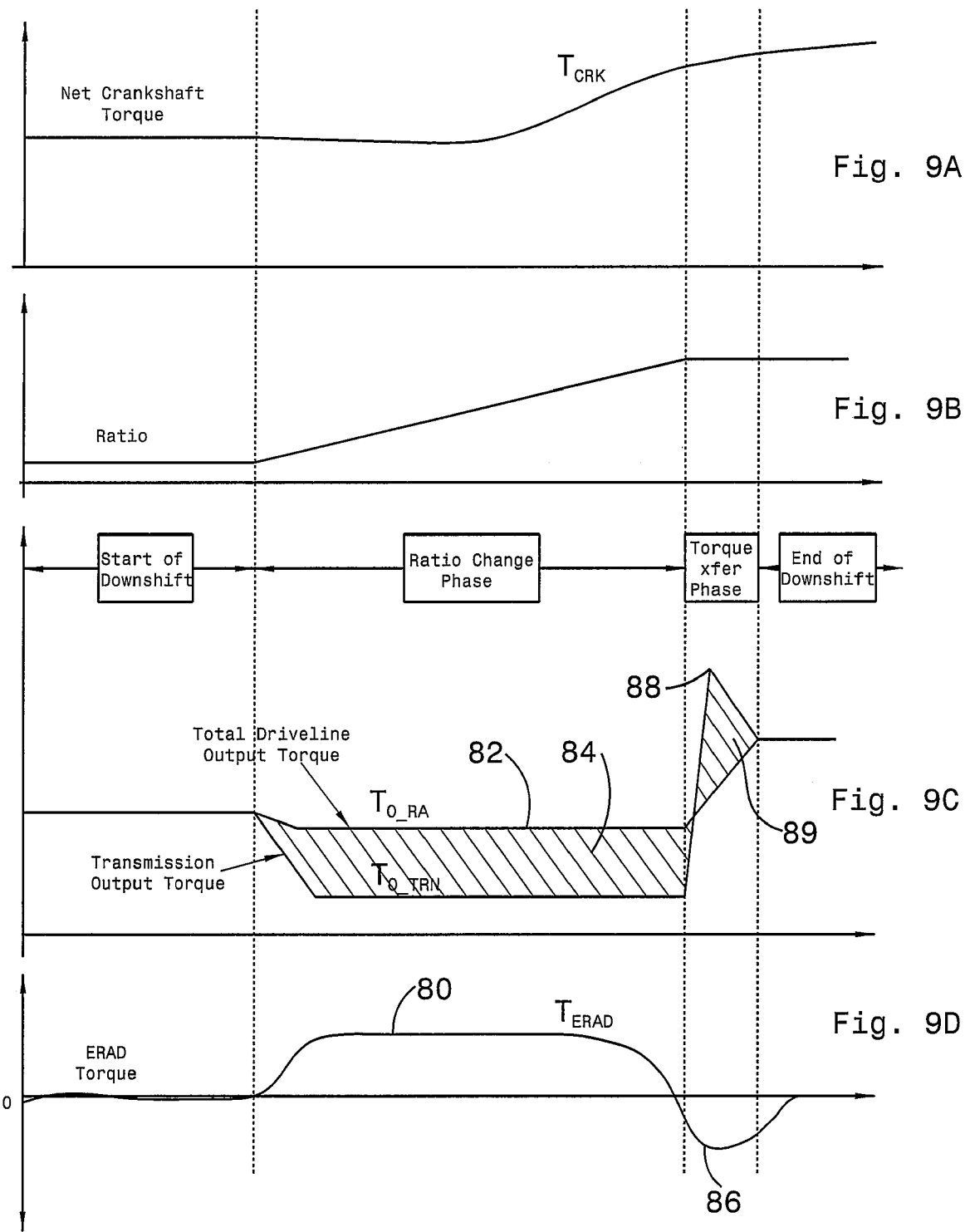

TORQUE MODULATION CONTROL OF A HYBRID ELECTRIC VEHICLE

BACKGROUND OF THE INVENTION

1. Field of the Invention

This invention relates generally to a powertrain for a hybrid electric vehicle (HEV), and in particular to controlling torque transmitted by the output of the powertrain to the vehicle wheels while executing a transmission shift.

2. Description of the Prior Art

In a conventional vehicle with a fixed-ratio transmission, the driver can experience driveline disturbances during a transmission shift event, i.e., an upshift or a downshift. The driveline disturbances occur due to the acceleration and deceleration of engine and transmission components, which acceleration and deceleration produce an inertial torque during the shift event. In the case of an upshift, the transmission output torque increases during the ratio change phase, i.e., inertia phase, of the shift as a result of the engine speed changing, as shown in FIG. 1 at point 12. This output torque disturbance is felt by the vehicle's occupants and severely degrades shift quality.

The magnitude of the output shaft torque disturbance increases the faster the upshift is performed, since the magnitude of engine deceleration is greater. By reducing engine torque produced during the upshift, as shown at point 14, the inertial torque can be offset and the output shaft torque increase can be minimized, as shown at point 16, thereby improving the quality of the shift. This method described with reference to FIG. 1 is referred to as "input torque modulation" control.

In the case of a downshift, the transmission output torque decreases during the ratio change phase as the engine and transmission components accelerate to the synchronous speed for the lower gear, as shown in FIG. 2 at point 18. Moreover, as shown at point 20 during the torque transfer phase, the transmission output torque can spike near the completion of the downshift as the engine accelerates. The drop in output torque during the ratio change phase is felt by vehicle's occupants and can give the sense of an acceleration discontinuity as the downshift is performed. The output torque spike at the end of the downshift can degrade shift quality and give the occupants a feeling of a harsh or rough shift. Furthermore, the magnitude of output shaft torque drop and spike near the end of the downshift increases in proportion to speed of the downshift. By using input torque modulation, the engine combustion torque is reduced near the end of the downshift, as shown at point 22, in order to reduce the engine's acceleration as the shift ends. As a result, the transmission output torque spike can be minimized and avoided, as shown at point 24, thereby reducing the shift disturbance.

In conventional vehicle applications, the problems that can occur with input torque modulation during shifts include limited engine torque reduction authority due to other constraints such as emissions, delayed or poor engine torque response to torque modulation requests, further degrading shift quality; and wasted fuel energy and efficiency since spark retardation is commonly used for achieving torque modulation requests.

SUMMARY OF THE INVENTION

In a powertrain for motor vehicle that includes an engine, a first electric machine and a second electric machine, each machine being able to function alternately as a motor and a generator, a transmission having an input driveably connected to the engine and the first electric machine and a transmission output driveably connected to the second electric machine and wheels of the vehicle, a method for controlling the powertrain includes using the engine to produce wheel torque, performing a gear shift using the transmission, if a reduction in powertrain output torque is to occur while modulating torque during the gear shift, operating one of the first electric machine and the second machine as an electric generator to reduce the net magnitude of torque transmitted to the powertrain output, and if an increase in powertrain output torque is to occur while modulating torque during the gear shift, operating one of the first electric machine and the second machine as an electric motor to increase the net magnitude of torque transmitted to the powertrain output.

Excess transmission output torque is converted into electrical energy that is stored by a battery while achieving the requested torque modulation and providing optimum shift quality.

Delays in crankshaft torque reduction are avoided by taking advantage of the electric machine's responsiveness, which produces an accurate magnitude of torque modulation.

In some cases, one or more of the electric machines and engine both reduce the total driveline output torque shift disturbance to meet the requested torque modulation level. This is useful in the case where the electric machines may not be fully available for torque modulation or the battery state of charge is near the maximum limit.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIGS. 9A-9D illustrate the change of powertrain variables during a transmission downshift performed with output torque modulation;

DESCRIPTION OF THE PREFERRED EMBODIMENT

Figure 1:
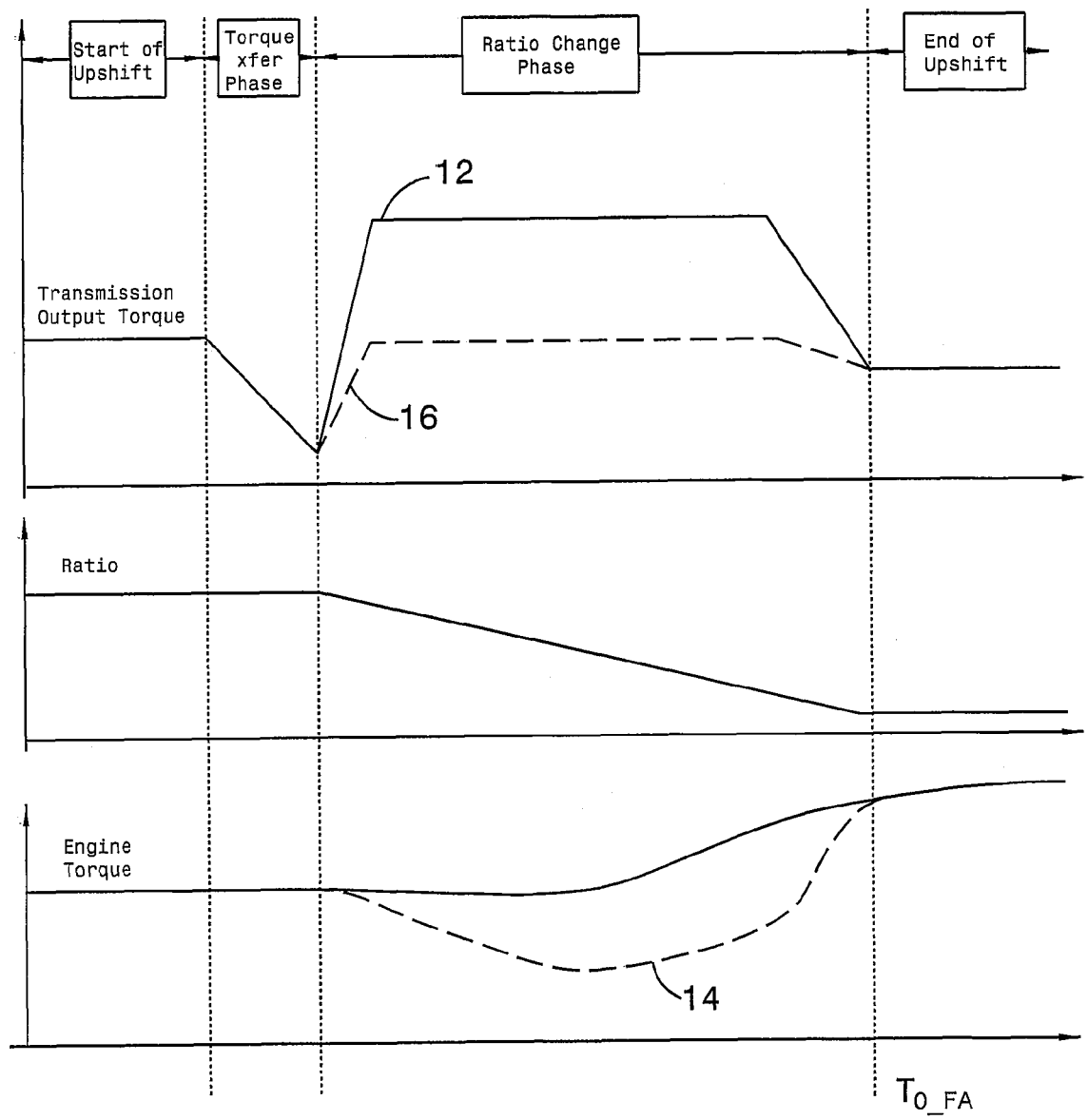
FIG. 1 is a graph that illustrates the variation of transmission output shaft torque, gear ratio and engine torque during an upshift with input torque modulation in a conventional vehicle driveline.
Figure 2:
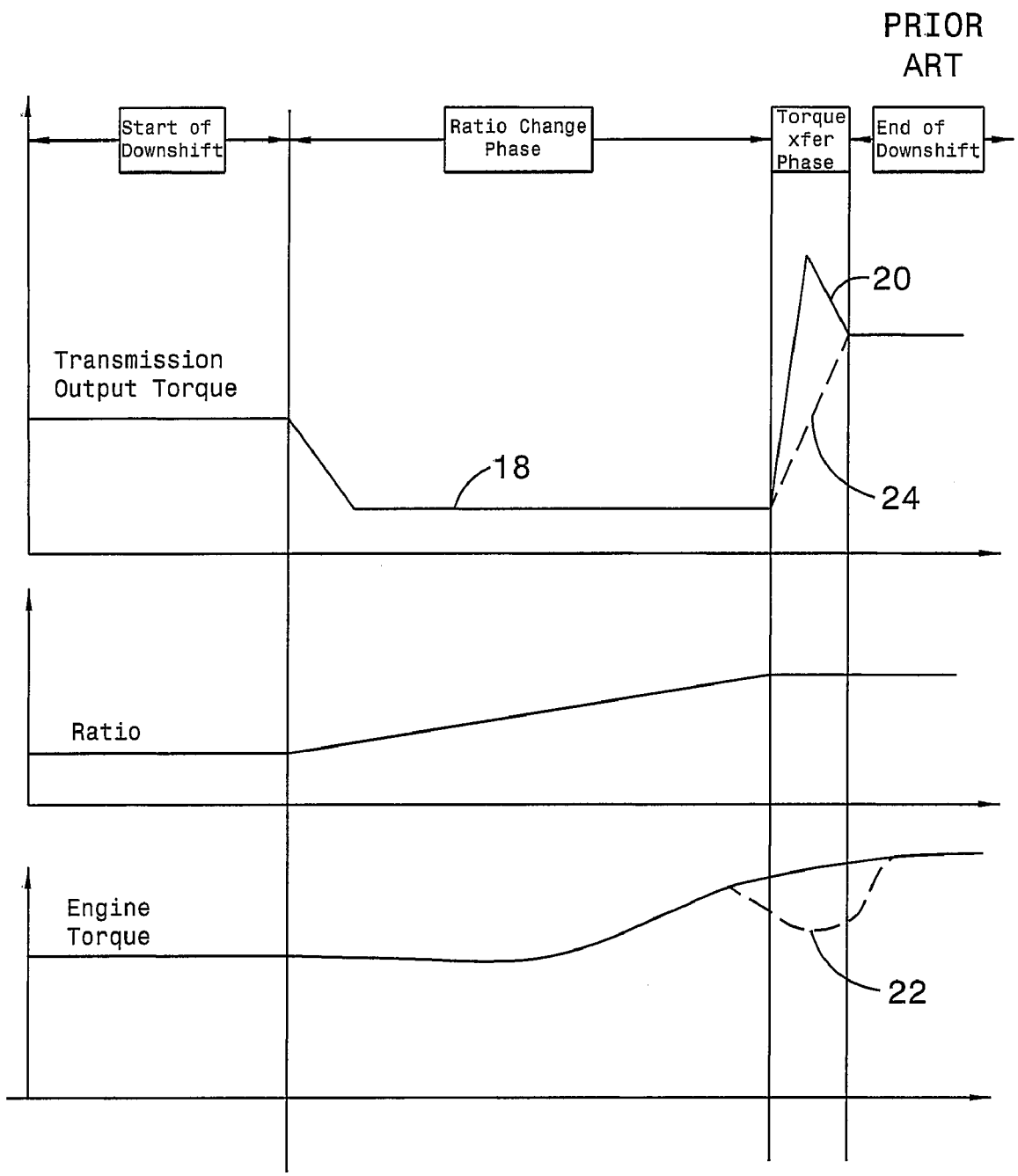
FIG. 2 is a graph that illustrates the variation of transmission output shaft torque, gear ratio and engine torque during an downshift with input torque modulation in a conventional vehicle driveline.
Figure 3:
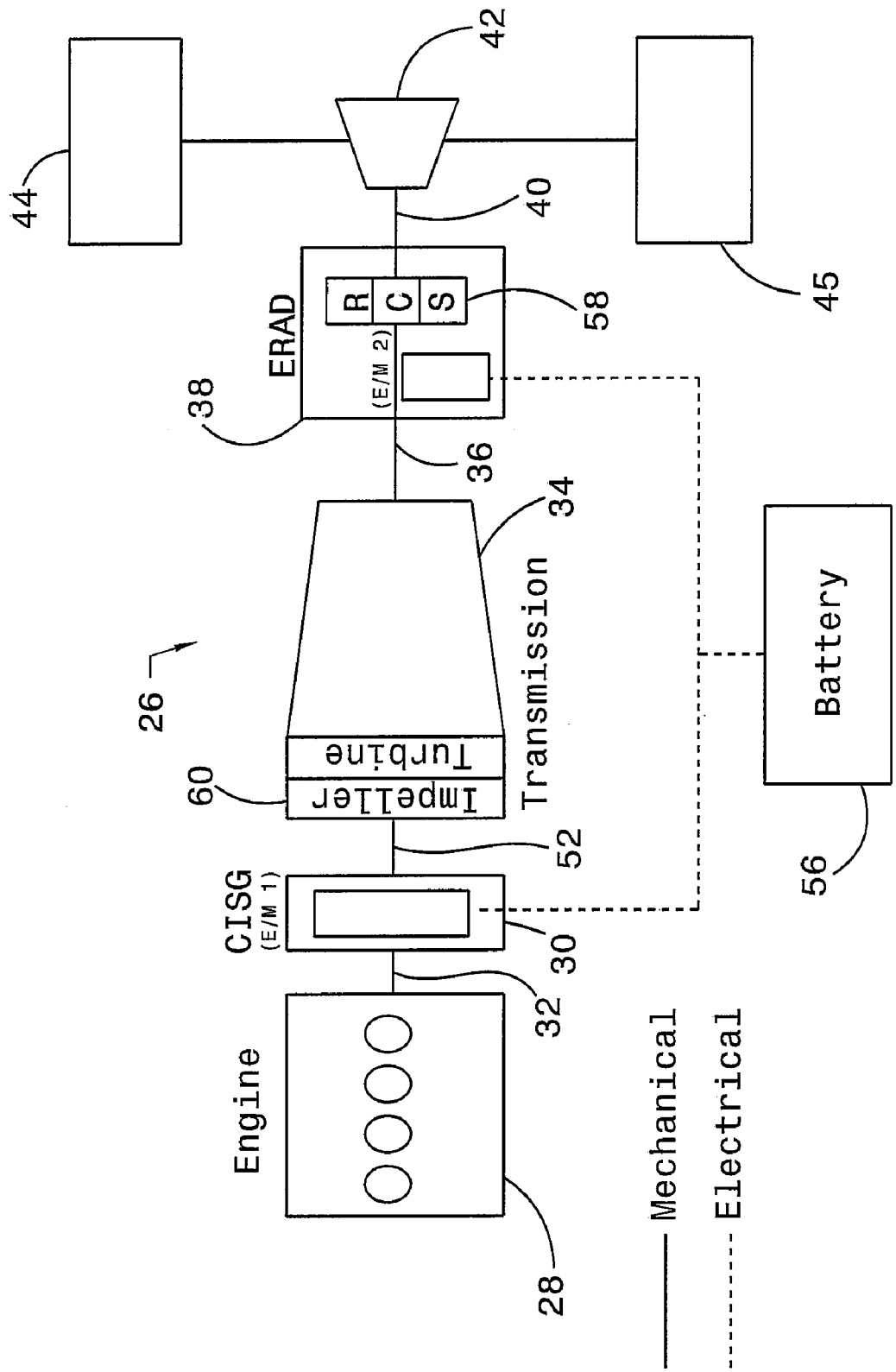
FIG. 3 is a schematic diagram of a powertrain for a HEV.

FIG. 3 illustrates a powertrain 26 for a hybrid electric vehicle that includes an internal combustion engine (ICE) 28, preferably an Atkinson cycle ICE; a first electric machine 30, preferably a crank integrated starter generator (CISG) driveably connected to the engine crankshaft 32 and able to function alternately as a motor and a generator; a fixed-ratio automatic transmission 34, a second electric machine 38 such as an electric rear axle drive (ERAD) or electric front axle drive (EFAD) driveably connected to transmission output shaft 36 and able to function alternately as a motor and a generator; a driveline output shaft 40, driveably connected to the second electric machine 38; a differential mechanism 42; and wheels 44, 45, driveably connected to the differential 42.

During a transmission shift event, the electric machine 38 that is coupled to the transmission output can be controlled to achieve accurately the transmission torque modulation request and reduce the driveline output torque shift disturbance at 40. By using the electric machines 30, 38 and the powertrain 26, torque disturbances on transmission output shaft 36 can be reduced and optimum shift quality can be achieved. Other configurations including RWD, FWD, or AWD full or mild HEV with at least one electric machine at the transmission output are also applicable. Furthermore, this concept is not limited to any particular transmission technology and includes conventional automatic, dual clutch (powershift), and converterless automatic transmissions.

Figure 4:
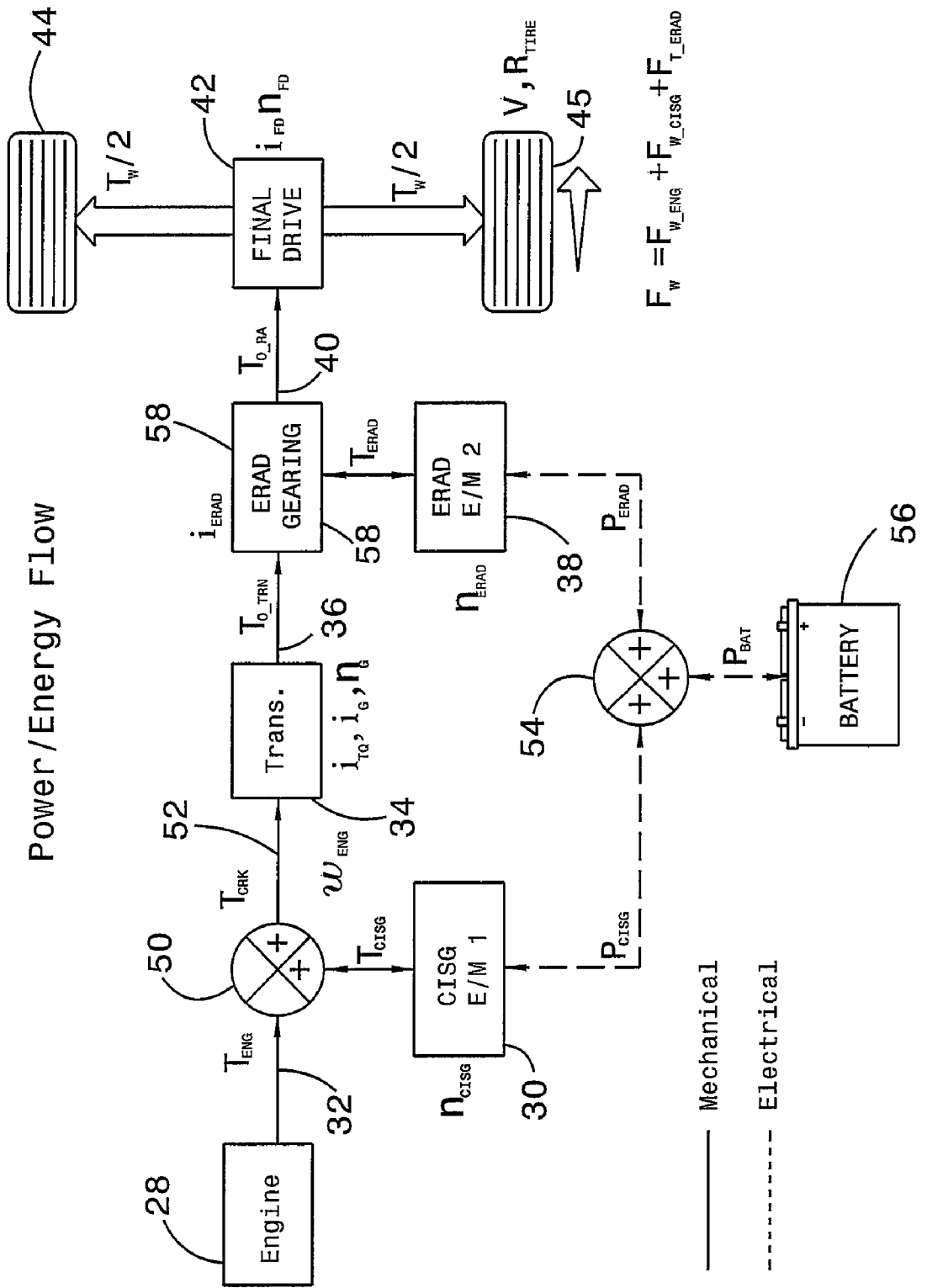
FIG. 4 is a schematic diagram showing propulsion and power flow in the HEV powertrain of FIG. 3.

FIG. 4 illustrates the power and energy flow in the powertrain 26. Power produced by engine 28 and power produced by CISG 30 are combined at 50 and transmitted to the transmission input 52. Electric power produced by both electric machines 30, 38 is combinable at 54 for charging the battery 56, or is transmitted from the battery to the electric machines 30, 38. Mechanical power produced by ERAD 38 is transmitted through ERAD gearing 58 to the load at the wheels 44, 45 through the rear final drive 42.

The RWD-HEV CISG/ERAD platform shown in FIG. 3 incorporates an Atkinson cycle (4.6 liter, 3 valve) internal combustion engine; a fixed ratio, six-speed automatic transmission; and two electric machines. The first electric machine 30 (CISG) is integrated at the output 32 of the engine 28 and is connected to the impeller 60 of a torque converter transmission, thus providing starter/generator capability. The second electric machine 38 (ERAD) is coupled to the output 36 of the transmission 34 through a planetary gear set 58, which is connected to the final drive, thus providing additional propulsion capability in either an electric drive or hybrid drive mode.

Major operating modes for this powertrain configuration include (1) electric drive with ERAD motoring/generating); series hybrid drive with engine running, CISG generating and ERAD motoring/generating); engine drive with CISG & ERAD shutdown and conventional drive; parallel hybrid drive with engine running and CISG and ERAD motoring; engine starting with CISG motoring to start engine and the engine cranking; and engine stopped with the engine cranking or shutting down.

As shown in FIGS. 5-7 and 10, operating modes of the powertrain 10 are used to provide transmission input and output torque modulation during transmission shift events. Depending on the type of shift event, i.e., an upshift or downshift, level of torque modulation request, CISG and ERAD operating conditions, battery conditions, and other factors, the appropriate powertrain operating mode will be used to provide the desired torque modulation request.

Figure 5:
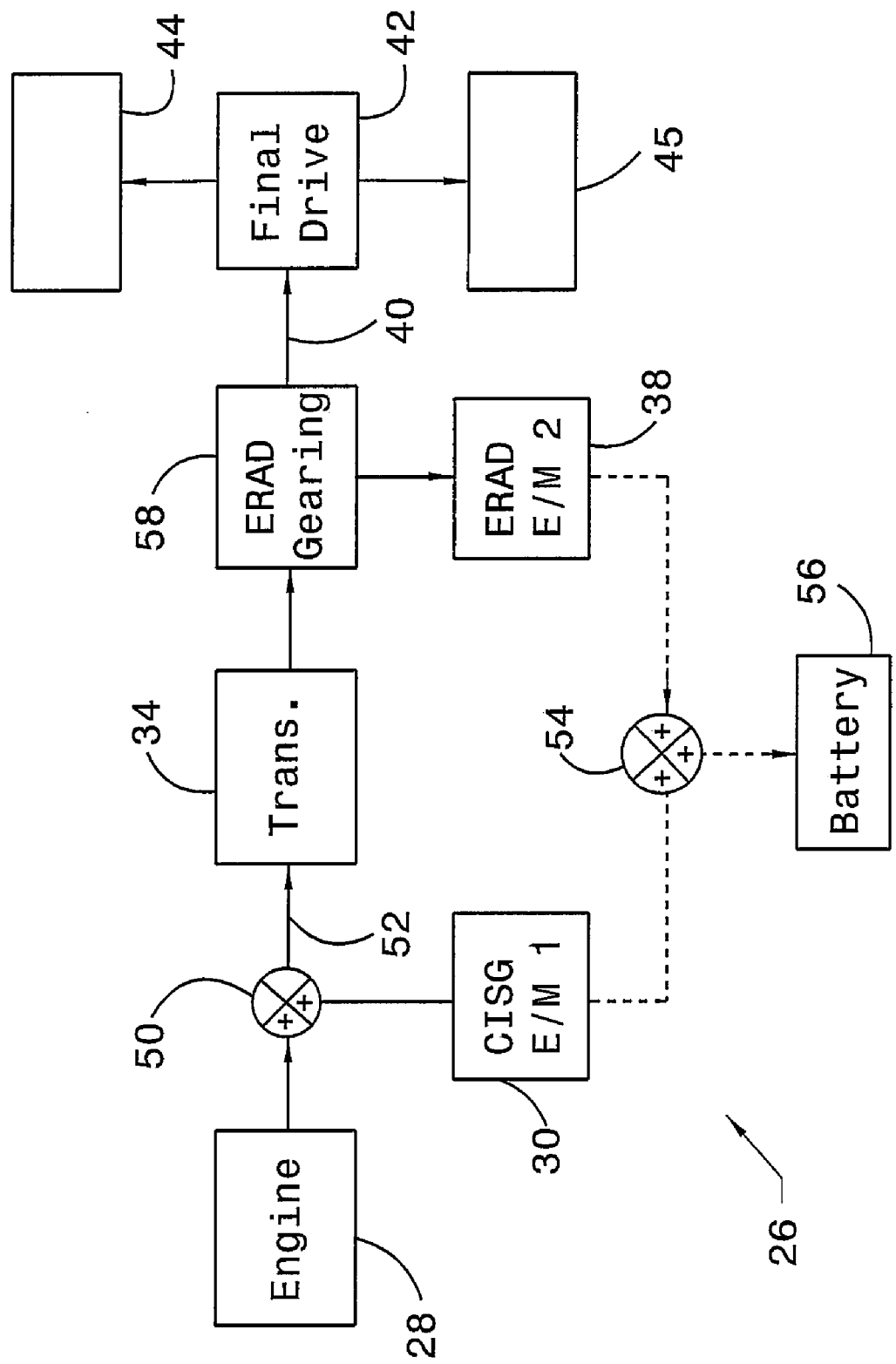
FIG. 5 is a schematic diagram showing vectors representing torque transmission among components of the powertrain operating in mode A, in which the second electric machine decreases the total driveline output torque during a shift.

FIG. 5 is a schematic diagram of the powertrain 26 showing vectors representing torque transmission among components during operating mode A, in which output torque modulation occurs with ERAD 38 reducing driveline output torque during a gear shift.

Figure 6:
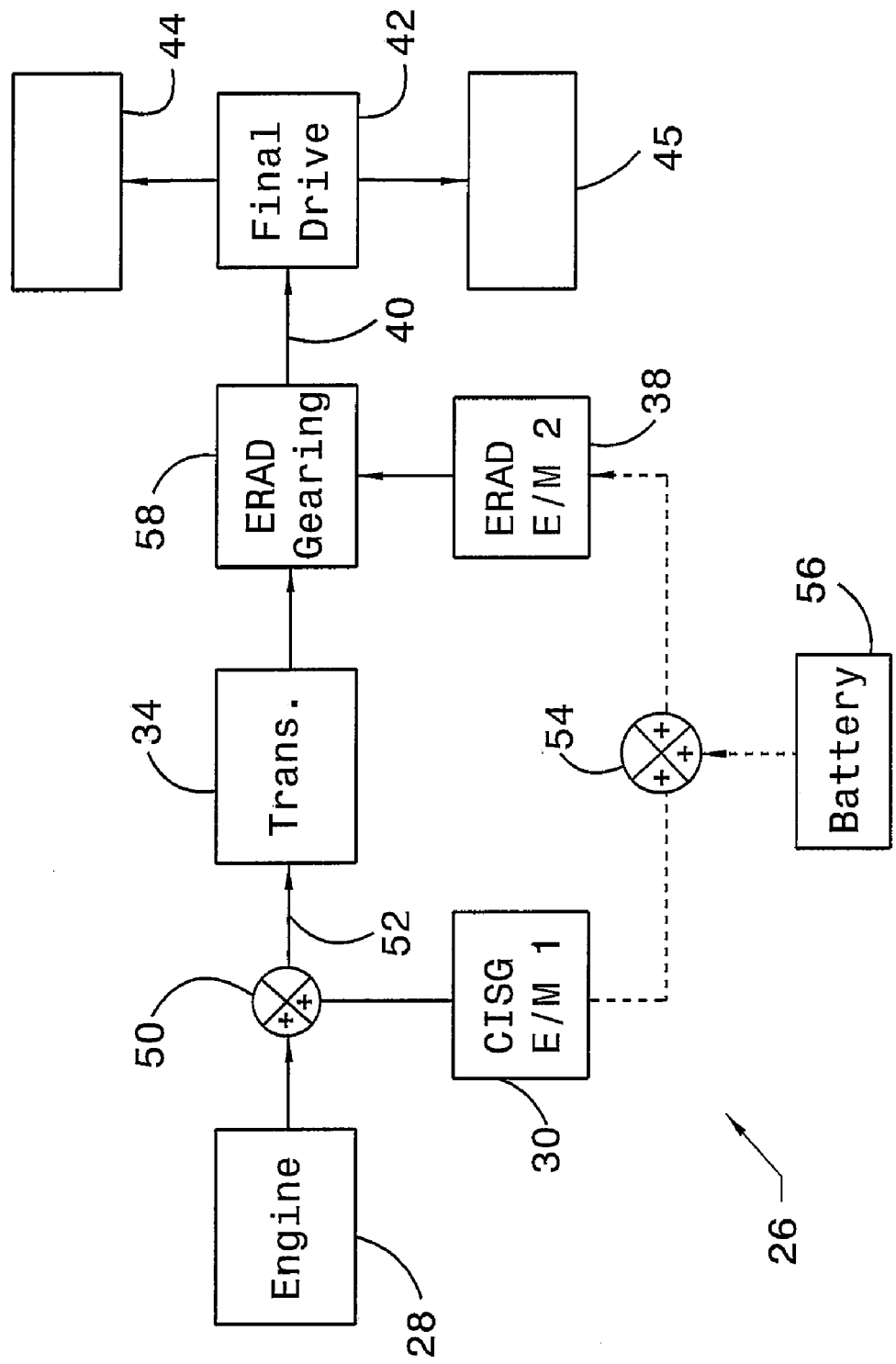
FIG. 6 is a schematic diagram showing vectors representing torque transmission among components of the powertrain operating in mode B, in which the second electric machine increases the total driveline output torque during a shift.

FIG. 6 is a schematic diagram of the powertrain 26 showing vectors representing torque transmission among components during operating mode B, in which output torque modulation occurs with ERAD 38 increasing driveline output torque during a gear shift.

Figure 7:
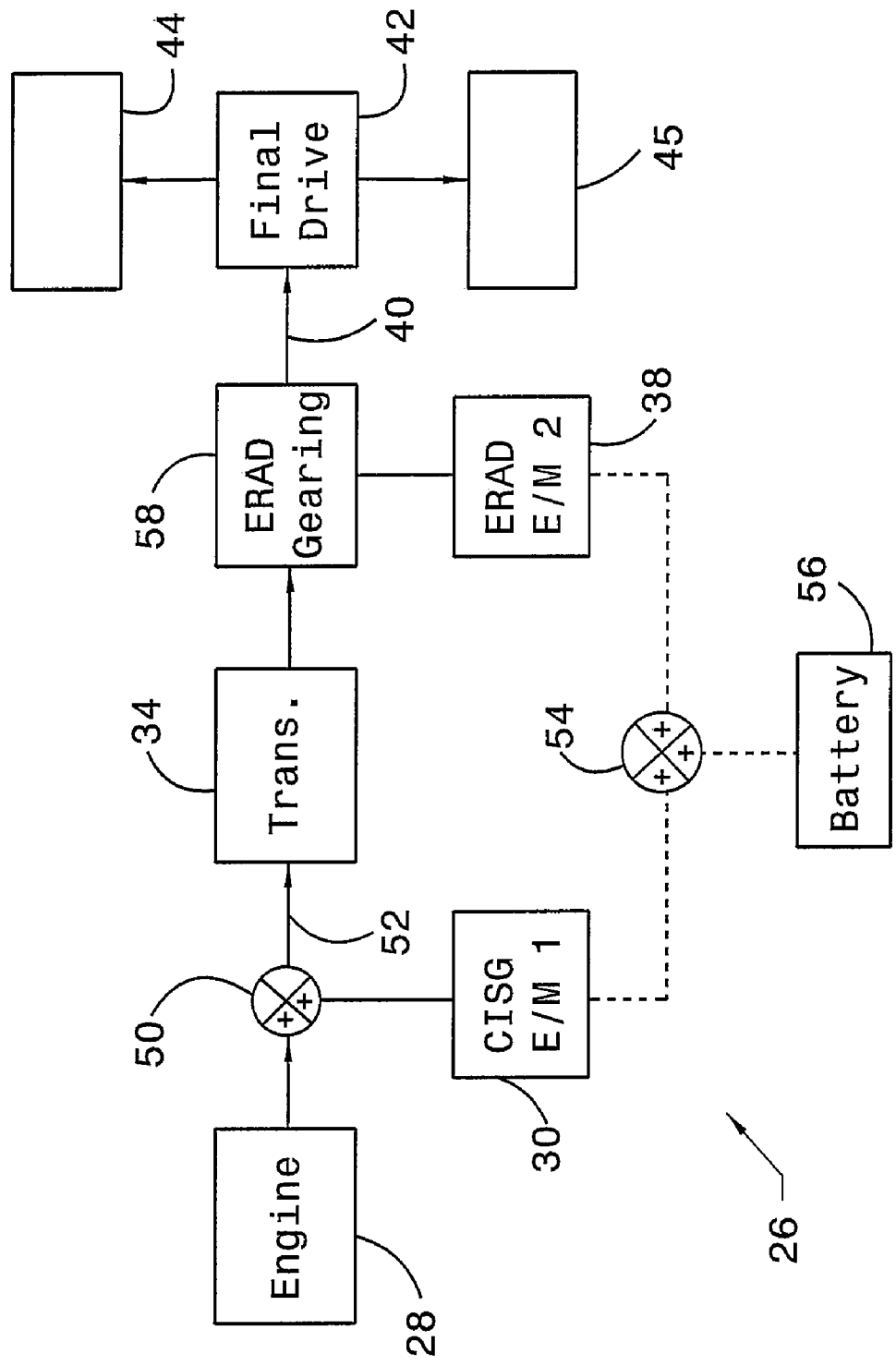
FIG. 7 is a schematic diagram showing vectors representing torque transmission among components of the powertrain operating in mode D, in which only the engine decreases the total driveline output torque during a shift.
Figures 8A, 8B, 8C, 8D:
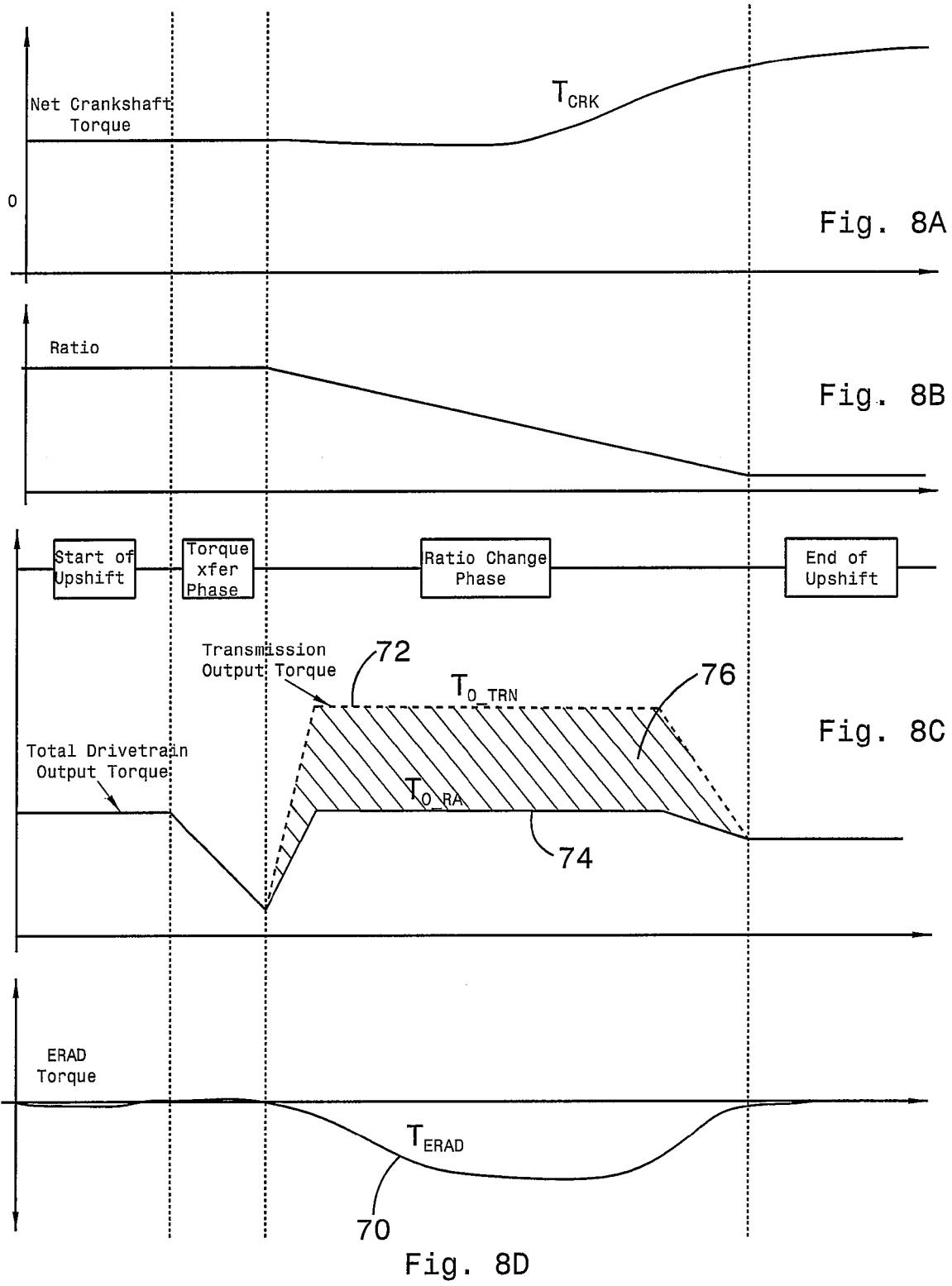
FIGS. 8A-8D illustrate the change of powertrain variables during a transmission upshift performed with output torque modulation.

FIG. 7 is a schematic diagram of the powertrain 26 showing vectors representing torque transmission among components during operating mode D, in which input torque modulation occurs with only the engine 28 reducing driveline output torque during a gear shift.

FIGS. 8A-8D illustrate an example of a transmission upshift, in which output torque modulation is provided by the ERAD 38 using the power path of operating mode A, shown in FIG. 5. In operating mode A, ERAD 38 provides output torque modulation by operating as a generator and provides negative torque 70, reducing the transmission output torque disturbance 72 during the shift to provide a smooth total driveline output torque 74, provided the ERAD is available for this purpose. The ERAD 38 is available if its current temperature is lower than its thermal limit, its speed is lower than its operational speed limit, torque modulation request is less than maximum ERAD torque limit, and the state of charge (SOC) of battery 56 is below the maximum allowable SOC limit.

By using operating mode A, excess transmission output torque 76 is converted into electrical energy that is stored by battery 56 while achieving the requested torque modulation and providing optimum shift quality. Furthermore, delays in crankshaft torque reduction are avoided by taking advantage of the ERAD's responsiveness, which produces an accurate magnitude of torque modulation. In operating mode A, both the ERAD 38 and engine 28 can also be used to reduce the total driveline output torque shift disturbance 72 in order to meet the requested torque modulation level. This combination of engine 28 and ERAD 38 is useful in the case where the ERAD may not be fully available or the battery SOC is near its maximum limit.

FIGS. 9A-9D illustrate an example of a transmission downshift in which output torque modulation is provided by the ERAD 38 using both operating modes A and B. During the ratio change phase of the downshift, operating mode B can be used with the ERAD 38 in a motoring mode to produce ERAD output torque 80 so that the net total driveline output torque 82 is increased in order to offset or compensate for the decrease 84 in transmission output torque that normally occurs during the ratio change phase of a downshift. Operating mode B can only be used if ERAD 38 is available for this purpose. The ERAD 38 is available if its current temperature is lower than its thermal limit, its speed is lower than its operational speed limit, the torque modulation request is less than maximum ERAD torque limit, and the state of charge (SOC) of battery 56 is above the minimum allowable SOC limit.

The powertrain 26 changes to operating mode A in the torque transfer phase near completion of the downshift so that ERAD operates as generator to produce negative torque 86, which reduces the net total driveline output torque in order to soften or eliminate the output torque spike 88, which would normally occur without torque modulation. Unlike that of the conventional case, with an HEV this excess torque 89 is converted into electrical energy to be stored by battery 56 while achieving the requested torque modulation and providing optimum shift quality.

Figure 10:
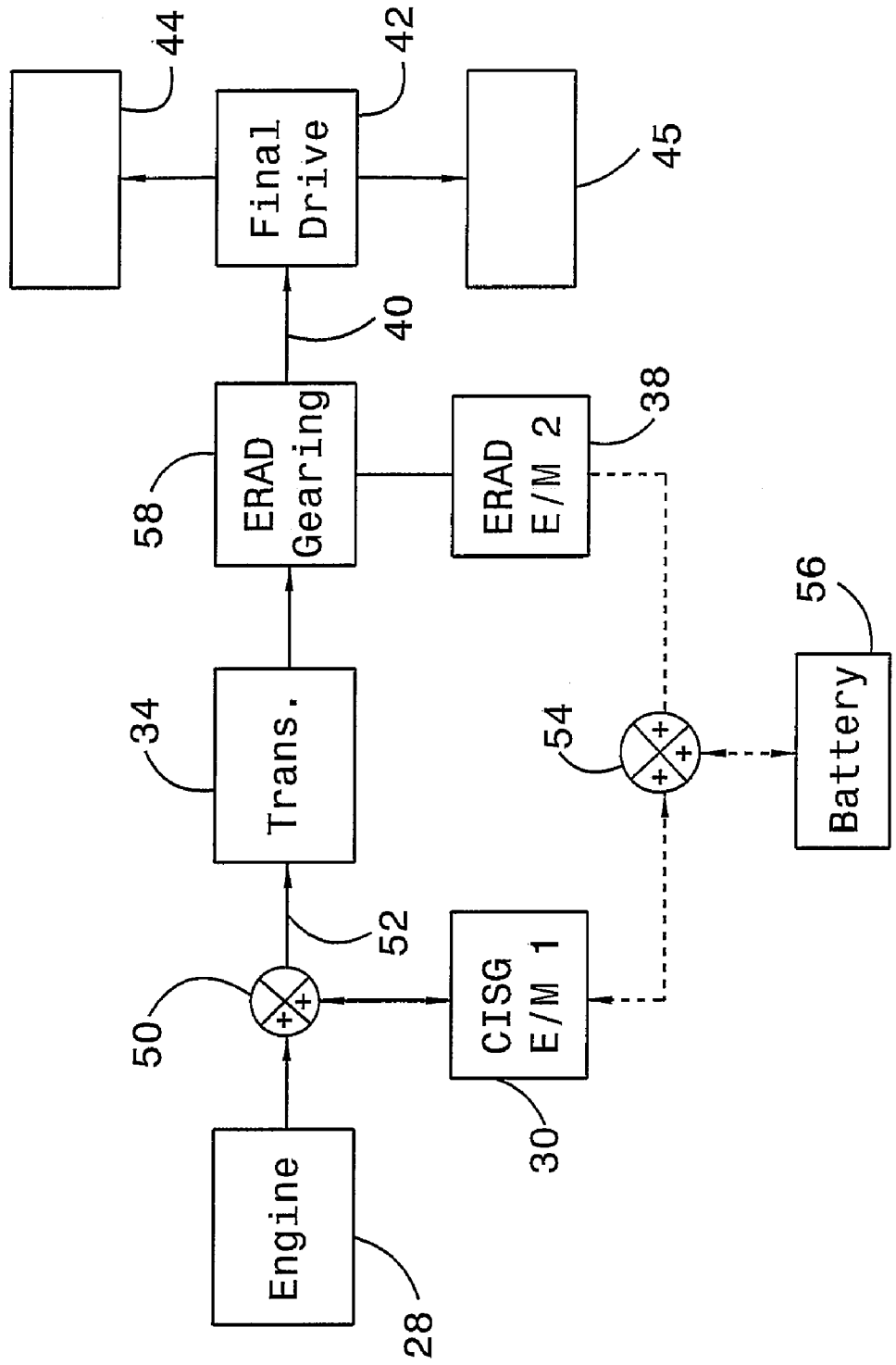
FIG. 10 is a schematic diagram showing vectors representing torque transmission among components of the powertrain operating in mode C, in which the first electric machine increases or decreases the total driveline output torque during a shift.

As shown in FIG. 10, operating mode C can be used to achieve the requested torque modulation for either an upshift or downshift in the case where ERAD 38 is not available due to its thermal limit being reached, the requested torque modulation magnitude being greater than the maximum torque capability of ERAD 38, or its maximum operating speed being reached.

Unlike operating modes A and B, in operating mode C, CISG 30 is used to provide input torque modulation, rather than transmission output torque modulation, as a means for reducing the net total driveline output torque shift disturbance.

Operating mode D can be used as a last priority to achieve the requested torque modulation level in the case where both ERAD 38 and CISG 30 are unavailable or the SOC of battery 56 does not allow for use of the electric machines 30, 38. In operating mode D, engine 28 is only used to provide input torque modulation as a means for reducing the net total driveline output torque shift disturbance.

Figure 11:
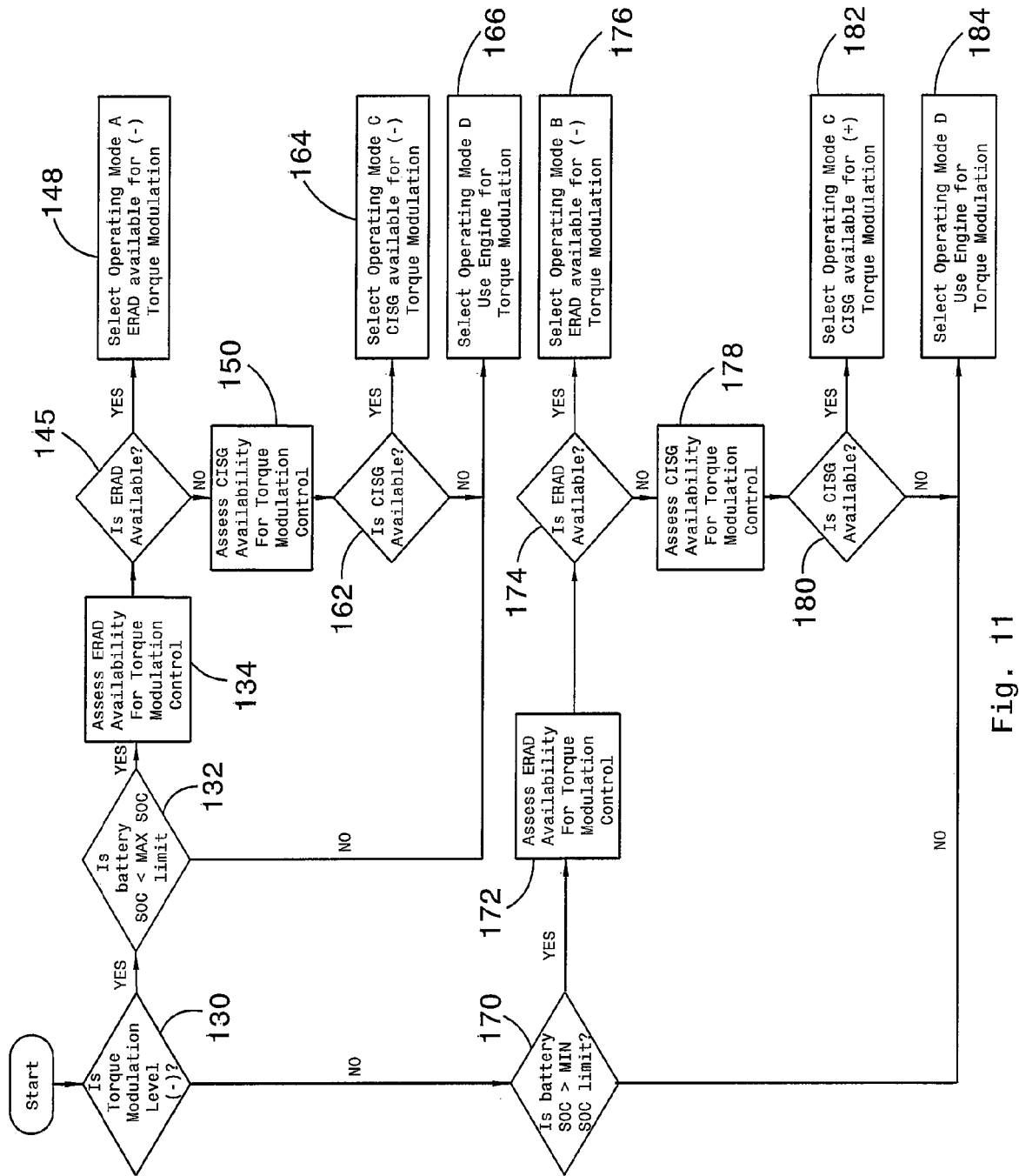
FIG. 11 is a logic flow diagram of an algorithm for providing input or output torque modulation transmission control in the HEV powertrain of FIG. 3.

FIG. 11 illustrates the steps of an algorithm for providing input or output torque modulation transmission control or a combination of input and output torque modulation in the HEV powertrain of FIG. 3. After beginning execution of the algorithm, a test is performed at step 130 to determine whether the desired magnitude of transmission torque modulation is negative. If the result of test 130 is positive, indicating that the desired torque modulation level is negative, a test is performed at step 132 to determine whether the battery SOC is less than a maximum allowable SOC reference. If the result of test 132 is positive, indicating that the battery SOC can be further increased while ERAD 38 or CISG 30 is operated as an electric generator, at step 134 the availability of ERAD 38 to participate in torque modulation control is assessed.

Figure 12:
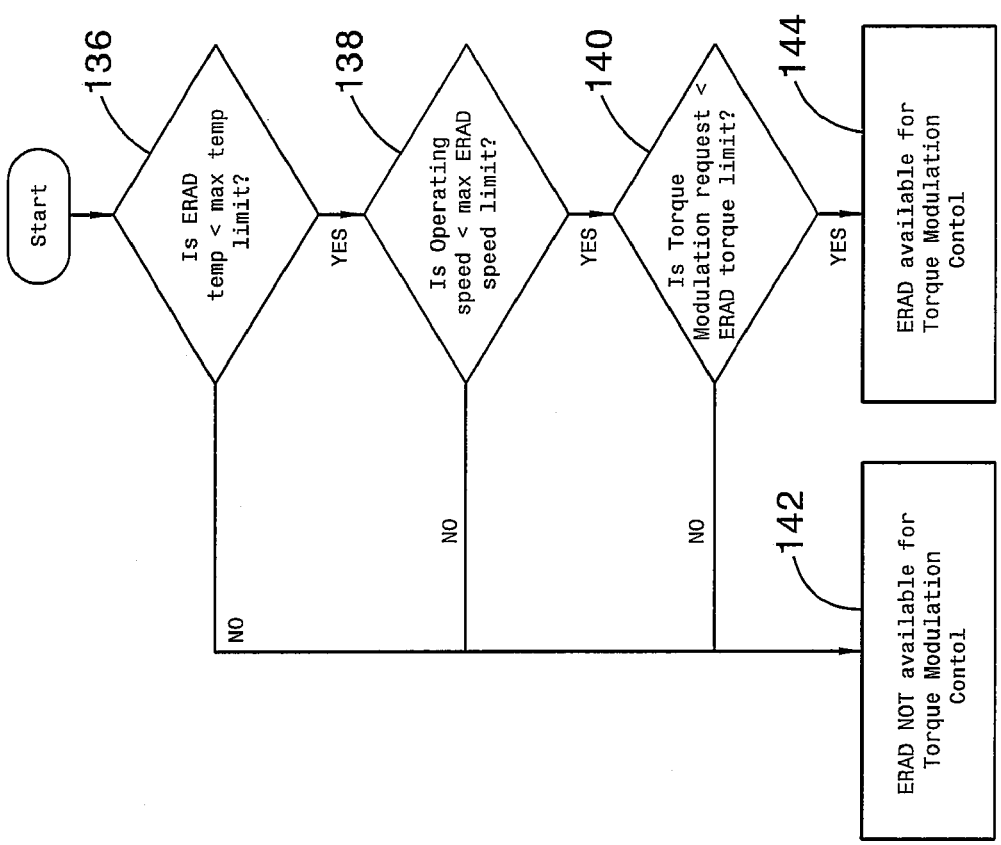
FIG. 12 is a logic flow diagram of an algorithm for determining whether the ERAD in the HEV powertrain of FIG. 3 is available for torque modulation control.

FIG. 12 illustrates the steps of an algorithm for determining whether ERAD 38 is availability to participate in torque modulation control. A test is performed at step 136 to determine whether ERAD 38 temperature is less than a maximum temperature reference.

If the result of test 136 is positive, a test is performed at step 138 to determine whether the speed of ERAD 38 is less than a reference speed representing the maximum allowable operating speed of the ERAD.

If the result of test 138 is positive, a test is performed at step 140 to determine whether the magnitude of a request for transmission torque modulation is less than a reference torque limit representing the current maximum torque capability of ERAD 38.

If the result of any of tests 136, 138 and 140 is negative, control advances to step 142, where ERAD 38 is determined to be unavailable to participate in torque modulation control. If result of test 140 is positive, control advances to step 144, where ERAD 38 is determined to be available to participate in torque modulation control.

Returning to the algorithm of FIG. 11, a test is made at step 145 to determine whether ERAD 38 is available to participate in torque modulation control. If the result of test 145 is positive indicating that ERAD 38 is available for torque modulation control, at step 148, powertrain 26 can be operated in mode A, i.e., with ERAD 38 functioning as an electric generator to produce negative torque on powertrain output 40.

Figure 13:
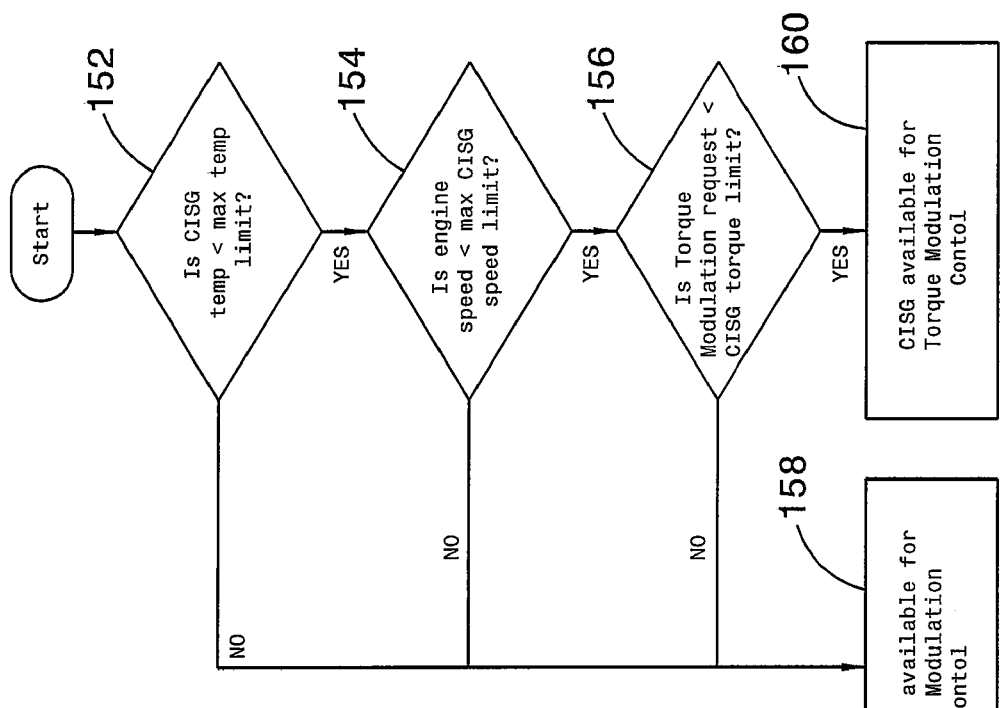
FIG. 13 is a logic flow diagram of an algorithm for determining whether the CISG in the HEV powertrain of FIG. 3 is available for torque modulation control.

FIG. 13 illustrates the steps of an algorithm for determining whether CISG 30 is availability to participate in torque modulation control. A test is performed at step 152 to determine whether the CISG 30 temperature is less than a maximum temperature reference.

If the result of test 152 is positive, a test is performed at step 154 to determine whether the speed of CISG 30 (i.e. engine speed) is less than a reference speed representing the maximum allowable operating speed of the CISG.

If the result of test 154 is positive, a test is performed at step 156 to determine whether the magnitude of a request for transmission torque modulation is less than a reference torque limit representing the current maximum torque capability of CISG 30.

If the result of any of tests 152, 154 and 156 is negative, control advances to step 158, where CISG 30 is determined to be unavailable to participate in torque modulation control. If result of test 156 is positive, control advances to step 160, where CISG 30 is determined to be available to participate in torque modulation control.

Returning to the algorithm of FIG. 11, a test is made at step 162 to determine whether CISG 30 is available to participate in torque modulation control. If the result of test 162 is positive, at step 164, powertrain 26 can be operated in mode C, i.e., with CISG 30 functioning as an electric generator to produce negative torque on transmission input 52.

If the result of any of tests 132 and 162 is negative, control advances to step 166 where powertrain 26 can be operated in mode D, i.e., with engine 28 participating in torque modulation control.

If the result of test 130 is negative, indicating that the desired torque modulation level is positive, a test is performed at step 170 to determine whether the battery SOC is greater than a minimum SOC reference limit. If the result of test 170 is positive, indicating that the battery SOC is sufficient and the battery can be discharged with either ERAD 38 or CISG 30 functioning as an electric motor, at step 172 the availability of ERAD 38 to participate in torque modulation control is assessed by calling and executing the algorithm of FIG. 12, as previously described.

A test is made at step 174 to determine whether ERAD 38 is available to participate in torque modulation control. If the result of test 174 is positive, at step 176, powertrain 26 can be operated in mode B, i.e., with ERAD 38 functioning as an electric motor to produce positive torque on powertrain output 40.

If the result of test 174 is negative indicating that ERAD 38 is not available for torque modulation control, at step 178, the availability of CISG 30 to participate in torque modulation control is assessed by calling and executing the algorithm of FIG. 13, as previously described.

A test is made at step 180 to determine whether CISG 30 is available to participate in torque modulation control. If the result of test 180 is positive, at step 182, powertrain 26 can be operated in mode C, i.e., with CISG 30 functioning as an electric motor to produce positive torque on transmission input 52.

If the result of any of tests 170 and 180 is negative, control advances to step 184 where powertrain 26 can be operated in mode D, i.e., with engine 28 participating in torque modulation control.

The torque modulation control strategy can be applied to RWD, FWD, AWD full or mild HEV powertrain configurations. Furthermore, the control strategy is not limited to any particular transmission technology, but can be applied to conventional automatic transmissions, dual clutch powershift transmissions, and converterless automatic transmissions.

In accordance with the provisions of the patent statutes, the preferred embodiment has been described. However, it should be noted that the alternate embodiments can be practiced otherwise than as specifically illustrated and described.

The invention claimed is:

1. A powertrain control method, comprising:
    (a) producing output torque using an engine;
    (b) during a transmission upshift, reducing output torque by operating an electric machine as a generator;
    (c) during a downshift, increasing output torque by operating said machine as a motor, and reducing output torque during a torque transfer phase of the downshift by operating said machine as a generator;
    (d) if said machine is unavailable, reducing transmission input torque by operating a second machine as a generator.

2. The method of claim 1 wherein step (b) further comprises the step of using the engine to reduce powertrain output torque during the gear shift.

3. The method of claim 1 wherein step (c) further comprises the step of using the engine to increase powertrain output torque during the gear shift.

4. The method of claim 1 further comprising the steps of:
    determining whether a temperature of the electric machine and a temperature of the second machine is less than a reference temperature of each of the corresponding electric machines; and
    executing one of steps (b) and (c) with one of the electric machine and the second electric machine whose temperature is less than the reference temperature of the corresponding electric machine.

5. The method of claim 1 further comprising the steps of:
    determining whether a speed of the electric machine and a speed of the second machine is less than a reference speed for each of the corresponding electric machines; and
    executing one of steps (b) and (c) with one of the electric machine and the second machine whose speed is less than the reference speed of the corresponding electric machine.

6. The method of claim 1 further comprising the steps of:
    determining whether a reference torque capability of the electric machine and a reference torque capability of the second machine is greater than a desired magnitude of torque modulation for each of the corresponding electric machines;
    executing one of steps (b) and (c) with one of the electric machine and the second machine whose current torque capability is greater the desired magnitude of torque modulation for the corresponding electric machine; and
    discontinuing use of said one of the electric machine and the second machine if the desired magnitude of torque modulation is equal to or greater than the current torque capability of said one of the electric machine and the second electric machine.

7. The method of claim 1 further comprising the steps of:
    if a torque modulation request is negative requiring a reduction in powertrain output torque during the gear shift, determining whether a battery state of charge is less than a reference maximum state of charge;
    executing step (b) if the battery state of charge is less than the reference maximum state of charge;
    discontinuing use of said one of the electric machine and the second machine if the battery state of charge is equal to or greater than the reference maximum state of charge; and
    using the engine to reduce the wheel torque during the gear shift.

8. The method of claim 1 further comprising the steps of:
    if a torque modulation request is positive requiring an increase in powertrain output torque during the gear shift, determining whether a battery state of charge is less than a reference minimum state of charge;
    executing step (c) if the battery state of charge is greater than the reference minimum state of charge;
    discontinuing use of said one the electric machine and the second machine if the battery state of charge is equal to or less than the reference minimum state of charge; and
    using the engine to reduce the wheel torque during the gear shift.

9. The method of claim 1 further comprising the step of using the engine to decrease wheel torque during the gear shift if a torque modulation request is negative requiring a reduction in wheel torque during the gear shift and a battery state of charge is greater than the reference maximum state of charge.

10. The method of claim 1 further comprising the step of using the engine to increase wheel torque during the gear shift if a torque modulation request is positive requiring an increase in wheel torque during the gear shift and a battery state of charge is less than the reference minimum state of charge.

11. A powertrain control method, comprising:
    (a) producing output torque using an engine
    (b) determining whether a battery state of charge is less than a reference state of charge;
    (c) during a transmission upshift, reducing output torque by operating an electric machine as a generator;
    (d) during a downshift, increasing output torque by operating said machine as a motor, and reducing output torque during a torque transfer phase of the downshift by operating said machine as a generator;
    (e) if the battery state of charge is less than a reference maximum state of charge, performing the downshift and reducing transmission input torque by operating a second machine as a generator.

12. The method of claim 11 further comprising the steps of:
    determining whether a temperature of the second machine is less than a reference temperature;
    executing one of steps (c), (d) and (e) to modulate torque during the gear shift if the temperature of the second machine is less than the reference temperature; and
    discontinuing use of the second machine to modulate torque during the gear shift if the temperature of the second machine is greater than the reference temperature.

13. The method of claim 11 further comprising the steps of:
determining whether a temperature of the second machine is less than a second reference temperature;
executing one of steps (c), (d) and (e) if the temperature of the second machine is less than the second reference temperature;
discontinuing use of the second machine to modulate torque during the gear shift if the temperature of the second machine is greater than the second reference temperature;
determining whether a temperature of the first electric machine is less than a first reference temperature; and
executing one of steps (c), (d) and (e) using the electric machine to modulate torque during the gear shift if the temperature of the electric machine is less than the first reference temperature.

14. The method of claim 11 further comprising the steps of:
determining whether a speed of the second machine is less than a reference speed;
executing one of steps (c), (d) and (e) to modulate torque during the gear shift if the speed of the second machine is less than the reference speed; and
discontinuing use of the second machine to modulate torque during the gear shift if the speed of the second machine is less than the reference speed.

15. The method of claim 11 further comprising the steps of:
determining whether a speed of the second machine is less than a second reference speed;
executing one of steps (c), (d) and (e) if the speed of the second machine is less than the second reference speed;
discontinuing use of the second machine to modulate torque during the gear shift if the speed of the second machine is less than the second reference speed;
determining whether a speed of the electric machine is less than a first reference speed; and
executing one of steps (c), (d) and (e) using the electric machine to modulate torque during the gear shift if the speed of the electric machine is less than the first reference speed.

16. The method of claim 11 further comprising the steps of:
determining whether a desired magnitude of torque modulation is less than a current torque capability of the second machine;
executing one of steps (c), (d) and (e) if the desired magnitude of torque modulation is less than the current torque capability of the second machine; and
discontinuing use the second machine to modulate torque during the gear shift if the desired magnitude of torque modulation is greater than the current torque capability of the second machine.

17. The method of claim 11 further comprising the steps of:
determining whether a desired magnitude of torque modulation is less than a current torque capability of the second machine;
executing one of steps (c), (d) and (e) if the desired magnitude of torque modulation is less than the current torque capability of the said second machine;
discontinuing use of the second machine to modulate torque during the gear shift if the desired magnitude of torque modulation is greater than the current torque capability of the second machine;
determining whether the desired magnitude of torque modulation is less than a current torque capability of the first machine; and
executing one of steps (c), (d) and (e) using the first machine to modulate torque during the gear shift if the desired magnitude of torque modulation is less than the current torque capability of the first machine.

* * * * *